United States Patent [19]
Carr et al.

[11] 3,879,533
[45] Apr. 22, 1975

[54] ENDOPARASITIC NEMATODE CONTROL BY ISOXAZOLES

[75] Inventors: John B. Carr; Duane K. Hass, both of Modesto, Calif.

[73] Assignee: Shell Oil Company, Houston, Tex.

[22] Filed: Jan. 18, 1974

[21] Appl. No.: 434,524

[52] U.S. Cl. ............................................... 424/272
[51] Int. Cl. ............................................ A61k 27/00
[58] Field of Search ................................... 424/272

[56] References Cited
UNITED STATES PATENTS
3,781,438  12/1973  Gibbons ............................. 424/272

*Primary Examiner*—Vincent D. Turner

[57] ABSTRACT

Nematode endoparasites of warm-blooded animals are controlled by 3-phenyl-5-(halo-, alkylthio- or alkoxy)-isoxazoles.

5 Claims, No Drawings

ENDOPARASITIC NEMATODE CONTROL BY ISOXAZOLES

DESCRIPTION OF THE INVENTION

It has been found that isoxazoles of the formula

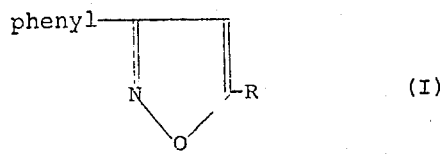

wherein R is halogen, particularly middle halogen (i.e., Cl or Br), alkylthio or alkyloxy, wherein each alkyl moiety contains from 1 to 4 carbon atoms, preferably 1 or 2 carbon atoms, effectively control nematode endoparasites without harm to the parasitized animal when used at the nematocidally effective dosage.

These isoxazole nematocides are a known class of compounds. Thus, the species wherein R is chlorine or bromine are disclosed in Adembri et al., Boll. Sci. Fac. Chim. Ind. Bologna 23 (2–3), 203–222 (1965) (63 C.A. 13234h (1965)), while the species where R is ethoxy is disclosed in Guadiano et al., Gazz. Chim. ital. 89, 2466–2478 (1959) (55 C.A. 6467c (1961)), and the species where R is ethylthio is disclosed in Adembri et al., J. Heterocyclic Chem. 4, 54–60 (1967). The corresponding other species can be prepared by the respective appropriate methods described in these references. Alternatively, the alkoxy-substituted species can be prepared by treating a halogen-substituted species with the appropriate alcohol in the presence of a base such as sodium hydroxide, while the alkylthio species can be prepared by treating a halogen-substituted species with the appropriate alkanethiol in the presence of a base such as a sodium alkoxide.

The activity of the nematocides of this invention, with respect to nematode parasites of warm-blooded animals and their relatively low toxicity with respect to the host animals — that is, their safety — were demonstrated by the following tests:

MAMMALIAN TOXICITY

This is defined as the maximum tolerated dosage (MTD), milligrams of test compound per kilogram of animal body weight, and was determined as follows: by intubation a group of rats was treated with a dosage of 500 milligrams of test compound per kilogram of rat body weight. If any of the rats died, further groups of rats were treated with successively smaller dosages of the test compound, until a dosage was found that all of the rats survived. This value (500 milligrams or less) was recorded as the maximum tolerated dose.

ANTHELMINTIC ACTIVITY

This is reported as the percent clearance of parasites from the test animal at a given dosage of the test chemical, in milligrams of test chemical per kilogram of the body weight of the test animal. This value was determined in each case as follows: male rats, each weighing approximately 50 grams, were exposed subcutaneously to approximately 500 *Nippostrongylus brasiliensis* (rat roundworm) infective larvae. Each test chemical was mixed with a suitable vehicle, such as corn oil or 1% methocel solution at approximate concentrations to give one or more of the following dosage levels: 500, 250, 125, 62, 31 or 16 milligrams test chemical per kilogram of rat body weight. (Example: at a dosage of 50 milligrams test chemical per milliliter of vehicle given at the rate of 1 milliliter per 100 grams of rat body weight would result in a dose of 500 milligrams test chemical per kilogram of rat body weight.) Two weeks after exposure to the infection, the infected rats were treated with the contemplated dosages of the test chemicals via gastric intubation. The treated rats then were held overnight without food or water and killed. The small intestine from each rat was removed, compressed between heavy glass plates and the number of worms remaining in the intestine were counted. Suitable control rats were included in each study.

The percent control was determined by the formula:

$$\% \text{ control} = \frac{NCA - NTA}{NCA} \times 100$$

where

NCA = average number of parasites in the control animals;

NTA = average number of parasites in the treated animals.

The following table reports the results. In the table each test chemical is identified by the moiety R, referring to Formula (I).

| Test Chemical (R =) | MTD | Nematocidal Activity (% Control at Indicated Dosage | | |
|---|---|---|---|---|
| | | 125 | 31 | 16 |
| Cl | 125 | 100 | 100 | 75 |
| Br | 250 | 100 | 95 | 90 |
| -OCH$_3$ | 500 | 100 | 85 | 45 |
| -OC$_2$H$_5$ | 500 | 100 | 80 | 60 |
| -SCH$_3$ | 250 | 100 | >95 | 30 |
| -SC$_2$H$_5$ | 500 | 100 | 0 | —* |

Not Tested

The nematocides of this invention can be used to control endo-parasitic nematodes generally, including roundworms, pinworms, whipworms, hookworms, threadworms, nodular worms, cecal worms, stomach worms, gullet worms, hairworms, thorn-headed worms, threadnecked worms, cooperias, and the like. Thus, these anthelmintics can be used to control species of nematodes of the genera Haemonchus, Hyostrongylus, Trichostrongylus, Ostertagia, Ascarops, Cooperia, Trichuris, Oesophagostomum, Strongyloides, Ascaris, Nematodirus, Ancylostoma, Necator, Gasterophilus, Enterubius, Nematospiroides and Syphacia, to name some typical genera.

These new nematocides are effective in controlling endoparasitic nematodes of mammals and birds, generally, and more particularly, in controlling such nematodes in livestock, such as cattle, swine, sheep and goats, in domestic pets, such as dogs and cat, in rabbits, in poultry such as chickens, turkeys, ducks, geese and the like, and in fur-bearing animals, such as mink, foxes, chinchilla, and the like.

These nematocides can be employed by the conventional means and techniques known in the anthelmintic art. They can be used to eradicate parasites already present or they can be used prophylactically. That is, they can be used to kill an already present infestation, or can be used to prevent infestation.

The dosage of the nematocide to be used will depend upon the particular kind or kinds of parasites to be controlled; the particular compound to be used, the kind of host animal, whether the nematocide is to be used to cure an already existing infection, or as a prophylactic; and the like. These factors are those ordinarily encountered in the treatment of animals to cure and/or prevent their infestation by nematodes. These factors and their solution are well known to the practitioners in the art. In general, however, larger doses are required to cure an already-existing infestation than are required for prophylaxis. Thus, dosages of the nematocide to provide as little as 1 milligram of the nematocide per kilogram of live body weight of the animal fed at regular intervals, twice daily or daily, for example, may be sufficient to prevent infestation of animals by nematodes.

However, prophylactic dosages ordinarily will amount to about 2–10 milligrams of the nematocide per kilogram of the animal body weight. The dosage required to eradicate already existing nematodes ordinarily will be at least 10 milligrams of the nematocide per kilogram of the animal body weight, with usual dosages being about 15 to 125 milligrams on the same basis. The maximum dosage, of course, in every case will be determined by the toxicity of the nematocide to the host animal. The nematocides of this invention effectively eradicate endoparasitic nematodes without ill effect upon the host animal.

These nematocides can be administered as a single dose, or alternatively, in multiple doses. They can be employed in any of a variety of dosage forms, which may include a nematocide alone or in combination with a pharmaceutical adjuvant or excipient such as a solid or liquid diluent, buffer, binder, coating material, preservative, emulsifier, or the like. Solid dosage forms such as tablets, capsules, and boluses, comprising the nematocide and one or more compatible pharmaceutically acceptable carriers, can be employed with good results. In addition, of course, the solid dosage forms can contain one or more of the commonly employed tablet lubricants, tablet disintegrants, and the like. Liquid compositions containing the nematocide are equally effective for controlling the parasites. Such compositions can take the form of solutions, suspensions, drenches, and the like, and can be administered orally in single or multiple doses.

The invention claimed is:

1. A method for controlling endoparasitic nematodes in warm-blooded animals which comprises orally administering to the animal a nematocidally effective dosage of an isoxazole of the formula:

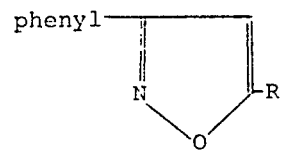

wherein R is halogen, alkyloxy or alkylthio wherein each alkyl moiety contains from 1 to 4 carbon atoms.

2. The method according to claim 1 wherein R is a middle halogen, alkyloxy or alkylthio wherein each alkyl moiety contains from 1 to 2 carbon atoms.

3. The method according to claim 2 wherein R is chlorine.

4. The method according to claim 2 wherein R is bromine.

5. The method according to claim 2 wherein R is methylthio.

* * * * *